United States Patent
McLean, Jr.

[11] 3,799,494
[45] Mar. 26, 1974

[54] MULTI-CAVITY MOLDS
[75] Inventor: George F. McLean, Jr., Middleton, Mass.
[73] Assignee: USM Corporation, Boston, Mass.
[22] Filed: May 11, 1972
[21] Appl. No.: 252,420

[52] U.S. Cl............... 249/119, 249/141, 425/817, 425/812, 425/250
[51] Int. Cl............................ B29f 1/00, B29c 1/00
[58] Field of Search .......... 425/812, 817, 420, 250, 425/4, 119, 120; 249/141, 119, 105; 425/812, 817, 420, 250, 119, 120

[56] References Cited
UNITED STATES PATENTS

| | | | |
|---|---|---|---|
| 2,266,831 | 12/1941 | Tegarty | 425/812 |
| 3,141,192 | 7/1964 | Benedetto | 425/817 |
| 3,068,523 | 12/1962 | Adinoff et al. | 425/812 |
| 3,354,509 | 11/1967 | Ammondson | 425/812 |
| 2,712,159 | 7/1955 | Ter Marsch | 425/817 |
| 2,178,774 | 11/1939 | Bogoslowsky | 425/812 |
| 2,766,484 | 10/1956 | Sanderson | 425/812 |
| 3,608,151 | 9/1971 | Cloutier et al. | 425/119 |

Primary Examiner—J. Spencer Overholser
Assistant Examiner—David S. Safran
Attorney, Agent, or Firm—Aubrey C. Brine

[57] ABSTRACT

A mold having a plurality of cavities for forming articles having complex shapes such as the unitary sole and heel tread member of a shoe wherein the article cast is of a foamed material such as polyurethane, specific charges of which are injected into the cavities in a liquid form, and expanded therein, each of the articles being expanded to a predetermined size, shape and density standard, the mold for such articles being formed of first and second mold members defining the molding cavities therein. When the mmebers are operatively assembled together for molding, at least one of the mold members is adapted with a sprue connected to a runner system communicating with each molding cavity for partially filling each cavity with the material. Venting means adapted with variable adjustment means extends from within each cavity through the mold member to the outside thereof, said sprue and runner system which leads to each cavity being of predetermined symmetry.

7 Claims, 3 Drawing Figures

PATENTED MAR 26 1974 3,799,494

MULTI-CAVITY MOLDS

BACKGROUND OF THE INVENTION

The art of shoemaking has advanced from the traditional shoe being built up on a last by the shoemaker craftsman to the stage where the article may be constructed of man-made materials such as plastics, and built up through one or more injection molding cycles. There are also numerous, continuing styling changes which occur in the shoemaking industry. These changes have caused the industry to be faced with totally new and markedly different requirements in shoe construction and apparatus for making same. The utilization of material such as polyvinyl chloride is well known as a substitute for leather in upper material. Likewise, the polymeric materials such as are available under trade names CORFAM and AZTRAN have also emerged as leather substitutes for shoe upper materials.

Various other articles of footwear departing from the traditional constructions have been made in recent years. Among these are the slush molded articles of unitary construction wherein the shoe sole or tread member and the upper are molded in a continuing operation. One or more materials may be used in such construction and the unitary article may be a product of several successive molding steps within a single mold. Quite often overshoes, boots and the like are manufactured by this process.

With the various new materials and construction techniques available, there has been a continued demand for further new types of footwear construction employing both previously known materials as well as the newer materials that are continually being developed. Current demands include a shoe at least resembling the traditional built-up article, however being made by high volume, low cost modern techniques. This demand has generated a greater need for a unitary sole/heel combination upon which the shoe upper may be attached. Likewise there is a growing requirement in the industry to use low cost foamable plastics such as polyurethane foam, because of its cost, lightness of weight and its wear characteristics.

The mass production molding of identical or similar articles of plastic material may be accomplished by injecting material such as molten polyvinyl chloride into a mold assembly having a plurality of identical cavities with a system of connecting runners which insure that each cavity is filled. The use of lighter weight expanded or foamed plastic materials has grown considerably but its use if not generally consistent with usual mass production methods such as that above. One preferred method involves partially filling a cavity with a specific charge of liquid material which is foamed and thus expanded until the mold cavity is filled. By using the same measured charge in the same or an identical cavity, a plurality of identical articles may be produced each having the same specific gravity as well as other characteristics.

This method does not lend itself easily to usual mass production techniques. Specifically, multi-cavity molds have not been used since there is no way to insure that each cavity receives the same volumetric charge since the cavities are only partially filled. Thus, it is usual in the production of foamed plastic articles to partially fill only one cavity at a time with measured charges.

The production of the unitary sole and heel tread member components of polyurethane foam has presented this and other significant problems to the existing art of molding of plastic materials. Liquid polyurethane is injected into a closed mold and expanded or foamed therein. The amount of liquid injected only partially fills the mold cavity. The expansion characteristics of the reactive materials cause the article to grow within the mold and, ideally, fully fill out the mold cavity. Concurrent with the growth of the material the air previously existing in the cavity must be vented from the mold cavity. At the same time extreme care must be incorporated in the mold design to insure that the air is not entrapped within certain areas of the mold, preventing the total filling in of the mold cavity during this growth process. A further requirement of the growth process of the urethane is that it be permitted to expand to such degree that the material achieves a predetermined desired specific gravity. Polyurethane foams when injected into molds in a liquid form normally have a specific gravity of approximately 1.2. When in the fully expanded state in the mold the polyurethane foam which is ideally suited for a tread member, will achieve a specific gravity of approximately 0.62.

In molding a plurality of similar articles from a single injection shot in a plurality of cavities, the requirement that polyurethane foams be expanded to a predetermined specific gravity creates a substantial problem in cast article uniformity within the individual shot. It should be recognized that the specific gravity of the particular article is determined in part by the size of the shot received within the particular cavity and the amount of foaming or expansion permitted of the material within the individual cavity. The necessity of insuring substantially equal volumetric shots in the plurality of cavites is of paramount importance. It has been found with a plurality of mold chambers connected by a common sprue runner that different pressure levels from one cavity to another may be generated by the partial filling of the cavity and the expanding materials. Such unbalanced pressures show some tendency for the unequal charging of the cavities or for flow of liquid polyurethane from one molded cavity through the common runner to another mold cavity. It should be recognized that were this to happen, the article formed in the cavity having the lesser amount of polyurethane could be more greatly expanded or foamed and thus have a lower specific gravity. Likewise, the article formed in the chamber having the greater shot of material could be less foamed or expanded and thus heavier or of a higher specific gravity. It should be appreciated that in order to control the specific gravity of the plurality of articles cast in a mold at a single time, some control must be exercised over the quantity of material injected into each mold cavity and coordinately the expansion of said material must be controlled so that each article arrives at the proper specific gravity when the article totally fills the mold.

Accordingly, incorporation of the various elements of the invention hereinafter described has enabled the casting of a plurality of articles of polyurethane foam in a single mold member having a plurality of cavities therein and a common sprue runner therebetween.

SUMMARY OF THE INVENTION

The overall objects of the invention include providing a mold adapted for casting an article wherein the article is of a material which is injected into the mold in liquid form (such as polyurethane) to partially fill the mold chamber and expanded therein (as by foaming).

To these ends and in accordance with certain features of the invention the mold includes first and second mold members forming at least two molding cavities therein, one of the members adapted with a sprue and runner system having a plurality of substantially symmetrical branches, one branch extending to each molding cavity and venting means for each cavity being generally conduit means extending from said molding cavity through one of said mold members externally thereof and at least one of said venting means adapted with valving means so that the venting means of the mold cavity may be adjusted.

DESCRIPTION OF THE PREFERRED EMBODIMENT

Figure 1:
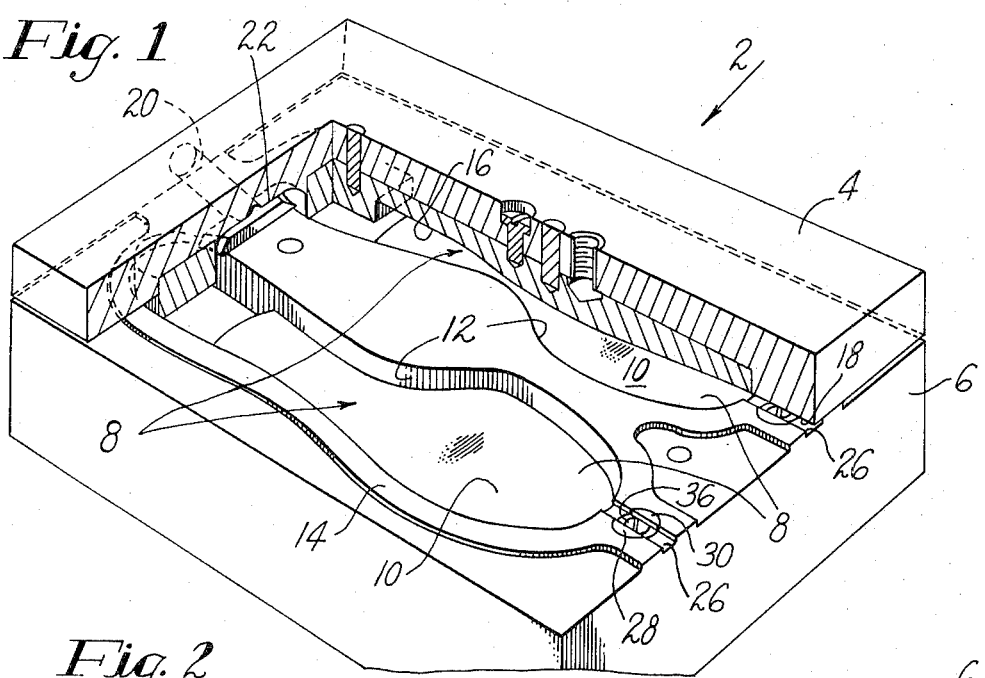
FIG. 1 is a perspective view partially in section of a foam mold assembly embodying my invention.

Referring now to the drawings in general and to FIG. 1 in particular, reference numeral 2 indicates a mold assembly having a top member 4 and a bottom mold member 6. In the illustrated embodiment, member 6 contains a plurality (in this instance, two) of molding chambers 8, generally defining the desired shape of the article to be formed (herein, a unitary sole and heel tread member).

The mold assembly 2 herein disclosed and embodying my invention is particularly adapted for forming foamed polyurethane tread members. As previously defined, the tread member is formed in the mold 2, solidified and removed from the mold, whereupon it may be coated with an adhesive as disclosed in U. S. Patent application Ser. No. 35,389 filed May 7, 1970 in the name of E. B. Hovey and assigned to the assignee of the present invention.

A desirable resilient polyurethane for use as a tread member is prepared by condensation and polymerization of a material having a plurality of active hydrogen groups with a material having a plurality of NCO groups. A wide variety of materials providing active hydrogen may be used; but it is preferred to use a mixture of diols and diamines. These are discussed in the aforementioned patent application Ser. No. 35,389.

The polyurethane material may be expanded to form the desired cellular product (unitary sole/heel tread member illustrated embodiment of the invention) by the interaction of water with isocyanate to generate $CO_2$. Alternatively, volatile organic liquids, such as methylene chloride, trichloromonofluoromethane and other volatile halogenated preferably fluorine containing organic liquids may be used. When water is used from 0.2% to 0.5%, preferably about 0.3% is used, based upon the weight of the resinous material, e.g. diol. Where a volatile organic liquid is used, there will be ordinarily used from about 5 to about 7 parts by weight of the organic liquid based upon 100 parts by weight of the resin material.

Any of the conventional catalyst systems may be used for insuring rapid and complete reaction of the components. A very satisfactory catalyst system is that shown in the application of Daniel Appleton, U. S. Ser. No. 784,361 filed Dec. 17, 1968 entitled "Process for Molding Polyurethane Foam Articles" and assigned to the assignee of the present invention. The disclosure of the above referred to application is incorporated in the present application by reference.

The reactive components and the volatile organic liquid, if used, are brought together and intimately mixed in measured relative quantities required for reaction and the mixture is discharged into molding cavity 8 as illustrated in FIG. 1. The portion of molding cavity 8 occurring within mold member 6 includes a bottom tread forming surface 10 and sole edge forming surface 12, with a mold sealing surface 14 extending outwardly from the sole edge forming surfaces 12. Top mold member 4 having a molding surface 16 has a sealing surface 18 extending outwardly therefrom for cooperation with the sealing surface 14 of mold member 6 to form closed molding chambers 8.

The reactive mixture is introduced into the closed molding cavities 8 through a sprue 20 having generally symmetric runners 22 therein extending from the common sprue 20 to each of the individual mold cavities 8. The amount of mixture injected partially fills the cavity, and is previously determined by weight and chamber volume to give a formed article of the desired weight and density. The reactive mixture may then react as by foaming in the individual molding cavities 8 to fill the remaining space within the mold cavities. The general structure of mold 2 and the method of making foam polyurethane tread members herein discussed thus far is known and previously discussed in one or more of the previously listed patent applications (insofar as molding in a single chamber is known).

In the illustrated embodiment, the material injected through sprue 20 is caused to be fairly equally divided amongst the mold cavities 8. As previously mentioned, equal volumetric charges to each cavity are important to achievement of uniformity in the formed articles. This is accomplished in part by the symmetrical runner system 22. Since a symmetrical runner system 22 ideally presents a uniform back pressure to the injection source through sprue 20 with respect to each cavity 8, a fairly uniform shot of material is received by each mold cavity. The back pressure on injection is also dependent in part upon the venting means subsequently discussed. Should a wide disparity in injection charge size occur for some unknown reason, further means are included within the distribution system including sprue 20 and runner 22 which will tend to equalize shots to the individual mold cavities 8. Runner system 22 is to be disposed in mold member 4 and 6 at a position which is ultimately below the liquid shot level of the complete shot of material when injected into the cavity 8. By such means if a wide disparity of shot size results, there will be a condition out of equilibrium wherein a larger head of material will be located in one cavity with respect to another. By known principles of equilibrium, if a common passage such as runners 22 exists below the ultimate levels of the liquid, the higher column will tend to flow down through the common connector to equalize heads on both columns. This self equalization of shot size may be enhanced by inclining mold 2 in a manner wherein the toe portion is elevated above the heel portion (containing the runner 22). I have found that orienting mold 2 on about a 20° slope from the horizontal is quite effective with the runner system 22 illustrated.

It will be recognized by those familiar with the art that such a free flowing, self-equalizing system may not totally answer the problem of evaluation of charges of material to the individual cavities 8. This is in part due to the unpredictability of the speed of solidification or foaming of the molding material. Should the material become substantially more viscous early in the charge as the material is being injected into the chambers, quite naturally, the ability of the material to free flow in a liquid form from one cavity into another may be reduced. This naturally will effect the self-equalizing capacity of the mold system and may also cause some unequal filling of the materials as by flowing into the mold system at a different viscosity than originally anticipated. In order to overcome these problems a second means of equalizing as well as controlling the specific gravity of the material while expanding is provided through control venting means 28.

Figure 2:
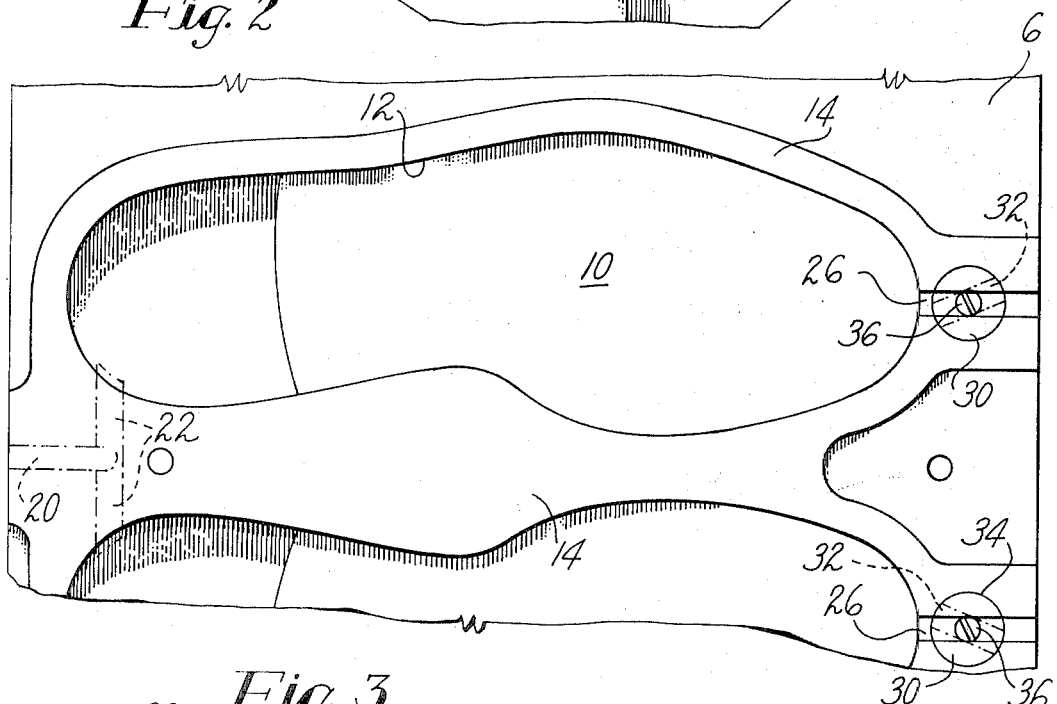
FIG. 2 is a partial plan view of one of the mold members of FIG. 1.
Figure 3:
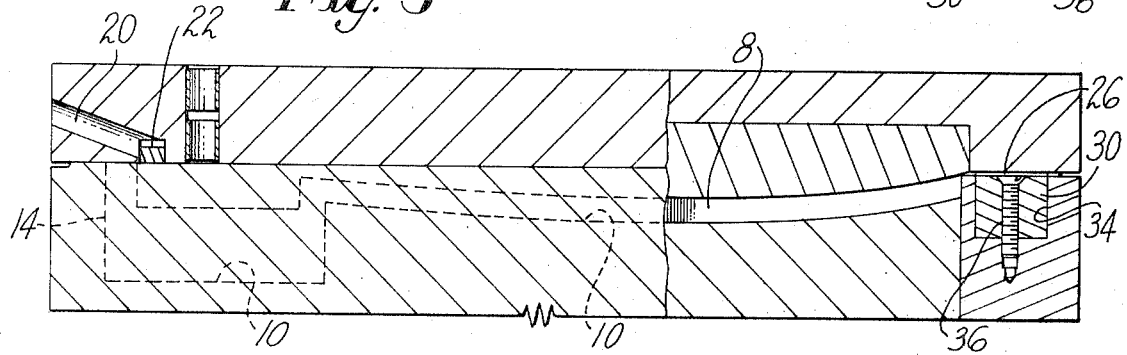
FIG. 3 is a sectional view in elevation of the mold assembly of FIG. 1.

As may be seen in FIG. 1 and as further illustrated in FIGS. 2 and 3, passageways 26 run generally through the mold members 4 and 6 opening both into the mold chambers 8 and to the atmosphere outside of the mold member 2. In the illustrated embodiment, passageways 26 are generally contained in bottom mold members 6 and may be formed by slots milled therein. The top portion of passage 26 is formed by the sealing surface 18 of mold member 4. Further, passageways 26 are adapted with variable adjustment means 28 for controlling the opening between cavity 8 and the atmosphere around the mold 2. In the illustrated embodiment adjustment means 28 includes a disk 30 having a slot 32 complementary to passageways 26. Disk 30 is received in a bore 34 and adapted for rotary movement therein, being secured in place by means such as screw 36.

The passageways 26 form venting means to assist in the exhaustion of undesired gases such as air from the melt chamber 8 during the injection and expanding molding processes. As mentioned above, as the reaction of the molding materials occurs and the article grows in the mold, air previously filling the cavity might become entrapped between mold walls (surfaces 10 and 12) and the advancing, expanding polyurethane material. Should pockets of gases develop, as described, the advancing material may be prevented from fully filling the mold chambers 8 and forming a completed unit sole/heel tread member.

In the illustrated embodiment passageways 26 measures about one inch long and 0.30 inches wide and 0.040 inches deep. Rotary valve 30 measures about 1 inch in diameter and is recessed about 1 to 1½ inches into the bore 34 in die member 6.

In the illustrated embodiment, each of the two cavities 8 has a volume of approximately 320 cubic centimeters, being designed to cast a unit sole/heel tread member of approximately 200 grams weight being for a man's shoe size.

The dimensions of the illustrated cavities are approximately 0.44 inches deep, 3.75 inches wide and 12.65 inches long. In casting unit sole/heel tread members of this size, the variable valve vent means 28 was adjusted to provide a vent opening of approximately 0.07 inches by 0.04 inches. These parameters provided a unit sole/heel tread member of polyurethane foam of the desirable density, namely, 0.62 grams per cubic centimeters within + 0.02 grams per cubic centimeters accuracy for a number of moldings made. Polyurethane foam materials utilized to achieve these results were Tyrolite 201 or 301, both available from USM Chemical Division of USM Corporation.

In the illustrated embodiment the normal sprue diameter at 20 was 0.250 inches and was with a runner at 22 between the cavities and the sprue adjusted to provide a symmetrical flow of material through the sprue 20 and runners 22 into the cavities 8.

Thus, by the injection of a 400 gram shot of liquid material through sprue 20, approximately 200 grams may be received by each mold cavity 8. It is thought that the controlled venting achieved by valves 30 further assists the uniformity of product during the expansion phase of the forming process. Inaccuracies in the initial charge (200 grams) are thought to be readjusted during the foaming cycle through the controlled venting. By adjusting vents 28 to exhaust at proper rates for predetermined equal quantities of material in individual mold cavities 8, further readjustment of individual shot size may be accomplished by my invention during the early stages of foaming. Should the liquid shots to individual cavities 8 be of improper size, the castings will grow at unequal rates. By controlling venting and thus the pressure within the individual cavities to be substantially that for optimum casting by known principles of equilibrium, the initial shots into each of the cavities 8 will be caused to equalize. Pressures in cavities of larger shots may tend to build up more quickly, and force the excess shot back through runner 22 to a cavity with a lesser shot and having a lesser than optimum pressure. Though these relative pressures are very low, the invention is remarkably effective in enabling an equally weighted, equally expanded article to be cast.

Within the context of the disclosed invention and practiced as an alternative embodiment, the pressure control means 28 may take the form of locally positively controlled pressure release valves sufficiently sensitive to operate at the low pressures developed by the urethane foaming or by individually remotely controlled valves. Sensing means may be inserted within the cavity 8 for activating a control such as known electric or pneumatic controls, to positively position a pressure relief valve to maintain predetermined desired pressures in each of the cavities 8.

While illustration of the invention in molds adapted for forming tread members for shoes does not require the above individually and precisely controlled venting means, it is quite conceivable that other applications such as large castings or those involving a plurality of materials would require closely controlled pressures and even individually controlled in one cavity with respect to another.

Although the invention has been described in a detailed manner and with reference to a specific embodiment and alternatives thereto, it should be understood that the invention is not limited thereto but rather includes all adaptations and modifications within the scope of the appendant claims.

I claim:

1. A mold for casting a plurality of articles of foamable material such as unitary sole and heel tread member for a shoe comprising: a first mold member having formed therein at least two molding cavities; a second mold member cooperable with said first mold member to close said molding cavities for molding; a single sprue disposed in said mold for receiving plastic material and joining a runner system for directing said material to said cavities said system having a plurality of branches equal in number to the number of mold cavities, and means for independently controlling that quantity introduced into each of said cavities, of a material introduced into said sprue, said control means comprising a plurality of venting conduits disposed in one of said mold members on the side opposite from said sprue and runner system, each extending from an opening in a respective one of said molding cavities to externally of said molding member, and independently adjustable valve means disposed in each of said conduits for establishing the opening size of each of said conduits at a predetermined value and maintaining the respective opening size of each of said conduits during the said casting process.

2. A mold according to claim 1 wherein said sprue and runner system are arranged generally symmetrical with respect to the flow characteristics thereof as to each of said mold cavities.

3. A mold in accordance with claim 1 wherein each of said conduits is generally rectangular in cross section and the lesser of the two cross sectional dimensions of said rectangular opening is less than .050 inches.

4. A mold in accordance with claim 3 wherein said adjustable valve means comprises a cylindrical disc disposed in said one mold member and having a length portion of said conduit formed therein, said disc being rotatable to thereby move said conduit portion out of alignment with the remainder of said conduit and lessen the minimum cross sectional area of said conduit opening.

5. A mold in accordance with claim 2 wherein said sprue and said runner system are disposed in one of said mold members in the portion of said mold member intended to be lowermost when said mold is in a casting position and molding material is provided to said mold cavities, said sprue and runner system being thereby disposed below the level of the material when supplied to said mold cavities.

6. A mold in accordance with claim 3 wherein each of said conduits is generally rectangular in cross section and the lesser of the two cross sectional dimensions of said rectangular opening is less than .050 inches.

7. A mold in accordance with claim 6 wherein said adjustable valve means comprises a cylindrical disc disposed in said one mold member and having a length portion of said conduit formed therein, said disc being rotatable to thereby move said conduit portion out of alignment with the remainder of said conduit and lessen the minimum cross sectional area of said conduit opening.

* * * * *